United States Patent
Haugh et al.

(10) Patent No.: US 7,512,990 B2
(45) Date of Patent: Mar. 31, 2009

(54) MULTIPLE SIMULTANEOUS ACL FORMATS ON A FILESYSTEM

(75) Inventors: Julianne Frances Haugh, Austin, TX (US); Gerald Francis McBrearty, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 762 days.

(21) Appl. No.: 10/687,258

(22) Filed: Oct. 16, 2003

(65) Prior Publication Data

US 2005/0086491 A1   Apr. 21, 2005

(51) Int. Cl.
*G06F 11/00* (2006.01)
(52) U.S. Cl. .............................. 726/30; 726/2; 726/17; 726/27; 713/182
(58) Field of Classification Search ................ 713/182; 707/200, 9; 709/217, 219, 229, 225; 726/2, 726/17, 27, 30; 711/150
See application file for complete search history.

(56) References Cited

U.S. PATENT DOCUMENTS 5,761,669 A * 6/1998 Montague et al. ....... 707/103 R
5,948,110 A * 9/1999 Hitz et al. ........................ 714/6
6,006,018 A   12/1999 Burnett et al.
6,119,151 A * 9/2000 Cantrell et al. ............... 709/216
6,457,130 B2   9/2002 Hitz et al. .................... 713/201
6,549,916 B1 * 4/2003 Sedlar ......................... 707/200
6,651,096 B1 * 11/2003 Gai et al. ..................... 709/223
6,871,245 B2 * 3/2005 Bradley ........................ 710/65
2002/0124053 A1 * 9/2002 Adams et al. ............... 709/216

OTHER PUBLICATIONS

Hitz et al. "Merging NT and UNIX Filesystem Permissions," Proceeding of the 2nd USENIX Windows NT Symposium, Seattle, Washington, Aug. 3-4, 1998, pp. 1-10.*

* cited by examiner

*Primary Examiner*—Kimyen Vu
*Assistant Examiner*—Baotran N To
(74) *Attorney, Agent, or Firm*—Yee & Associates, P.C.; Matthew W. Baca

(57) ABSTRACT

A mechanism is provided for administering and maintaining access control lists for a filesystem in a heterogeneous network environment. A filesystem includes an access mechanism for a native filesystem type. Files, directory structures, metadata, etc. are stored using the native access mechanism. Access control lists may also be stored for the native filesystem type using the native access mechanism. The filesystem also includes access mechanisms for one or more additional filesystem types. Access control lists may be stored for the additional filesystem types, as needed. Thus, any given filesystem object may have associated therewith two or more access control lists.

8 Claims, 5 Drawing Sheets

MULTIPLE SIMULTANEOUS ACL FORMATS ON A FILESYSTEM

BACKGROUND OF THE INVENTION

1. Technical Field

The present invention relates to computer filesystems and, in particular, to access control lists in computer filesystems. Still more particularly, the present invention provides a method, apparatus, and program for providing multiple simultaneous access control list formats on a filesystem.

2. Description of Related Art

Access control lists have become a common security feature in filesystems. An access control list (ACL) allows control of access to a file system object to be specified to the granularity of individual users or groups.

Early file system control mechanisms, such as those provided by the USG and BSD UNIX file systems, allowed access rights to be specified in terms of the object owner, the group associated with the object owner, and all other users who were neither the object owner nor members of the object owner's group. Each of those three entries provided a set of three permissions, read, write, and execute, with the interpretation of those permissions differing between file system objects which were directory objects and those which were not.

Extensions to that model, such as the ACL model provided by the UNIX System V Release 4 (SVR4) filesystem, allow additional user and group entries to be defined with each entry granting access to the same set of three permissions as the three base (object owner, object group, other) entries. A user or group entry is referred to as an access control entry (ACE). SVR4 enforces a rule requiring that all user-based ACEs be defined before all group-based ACEs, with the other permissions defined last.

The SVR4 ACL is evaluated in the order given, with the first matching user or group entry specifying the permissions which were granted. If no entries match the user or group values associated with the requesting process, the other permissions are used. This is an example of an "ordered" ACL.

Other ACL models, such as the ACL model provided by the AIX Version 3.1 (AIX) file system, allow additional entries to be defined with the identity portion of the entry allowing for inclusion of user and group identity information within a single entry. Access to the same set of read, write, and execute permissions can be specified in terms of granting access (permit), denying access (deny) or both granting the given permissions and denying the permissions which were not granted (specify).

No ordering rules, other than that the object owner and object group permissions are considered first, are imposed upon AIX ACLs. The AIX ACL is evaluated from beginning to end, with each matching entry used to determine the final set of access permissions. If no entries match the user or group values associated with the requesting process, the other permissions are used. This is an example of an "unordered" ACL.

The filesystem and/or ACL model may be chosen based upon preference or need. However, in a network data processing system, several disparate filesystems and ACL models may exist. The task of converting from one ACL type to another becomes critical in a network environment with heterogeneous filesystems and ACL models. However, as filesystems increase in complexity, this task becomes more difficult.

One solution to this problem is for every filesystem to use the same ACL model. The most recent attempt at creating a standard ACL interface was undertaken by the Portable Operating System Interface for UNIX (POSIX) security working group. This standard ACL model was originally known as POSIX standard 1003.6, which is now 103.1e but commonly referred to as "dot6." When working group members were unable to reach a consensus on ACLs and many other security features, the standard was abandoned.

Interest in the POSIX ACL model has increased with the open source community with dot6 implementations on such systems as Linux and FreeBSD. Despite the attempt at creating a de facto ACL standard by embracing the defunct dot6 standard, vendors have proceeded to create ACL models which are supersets of dot6 or completely unrelated to dot6. Thus, it would appear that there may never be a standard ACL model.

Another solution in a heterogeneous network environment is to perform individual filesystem-to-filesystem conversions on ACLs. Each filesystem must be modified to perform a conversion for every other ACL model on the network. This solution is cumbersome and possibly inaccurate.

Therefore, it would be advantageous to provide an improved mechanism for administering and maintaining access control lists for multiple, differing filesystem types.

SUMMARY OF THE INVENTION

The present invention provides a mechanism for administering and maintaining access control lists for a filesystem in a heterogeneous network environment. A filesystem includes an access mechanism for a native filesystem type. Files, directory structures, metadata, etc. are stored using the native access mechanism. Access control lists may also be stored for the native filesystem type using the native access mechanism. The filesystem also includes access mechanisms for one or more additional filesystem types. Access control lists may be stored for the additional filesystem types, as needed. Thus, any given filesystem object may have associated therewith two or more access control lists.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
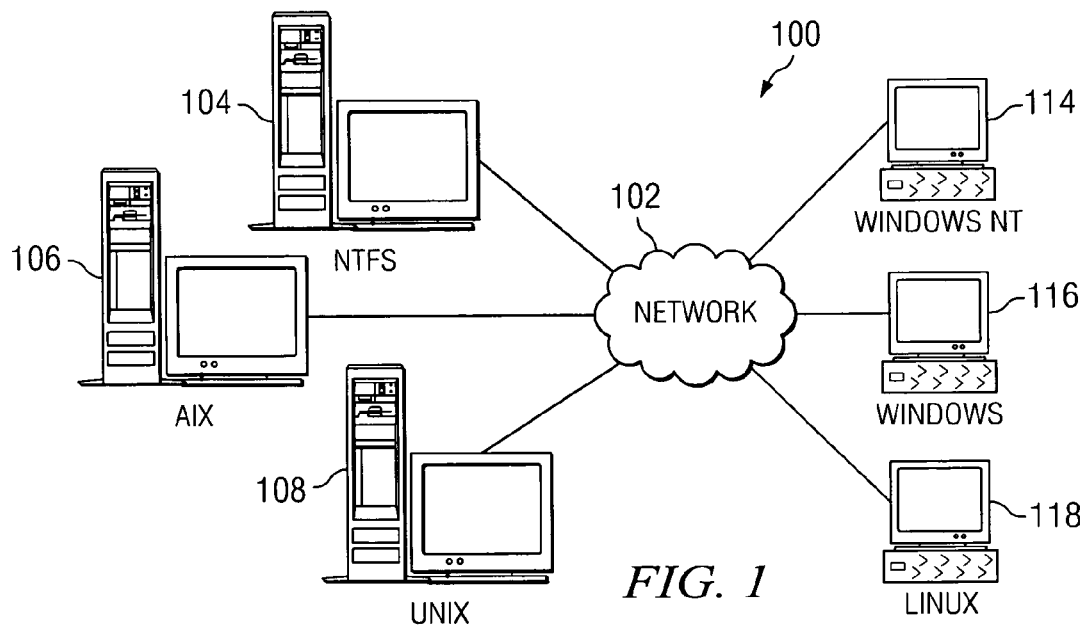
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, servers 104, 106, 108 are connected to network 102. In addition, clients 114, 116, 118 are connected to network 102. These clients 114, 116, and 118 may be, for example, personal computers or network computers. In the depicted example, servers 104, 106, and 108 provide data, such as boot files, operating system images, and applications to clients 114-118. These files are stored by the servers in a filesystem. The clients also store files in a filesystem. For example, server 104 stores files in a Windows NT™ filesystem (NTFS); server 106 stores files in an AIX file system; and, server 108 stores files in a UNIX file system, such as System V Release 4 (SVR4). Similarly, client 114 stores files in a Windows NT™ filesystem; client 116 stores files in a Windows™ based filesystem, such as FAT32; and, client 118 stores files in a Linux file system.

The disparate filesystems and, more particularly, the differing access control list (ACL) models in network data processing system 100 pose problems for filesystems. For example, client 118 may request a Linux-based file system ACL, such as a network filesystem (NFS) ACL, from server 104, which would normally provide an NTFS ACL. In accordance with a preferred embodiment of the present invention, server 104 includes a mechanism for administering and managing ACLs in a heterogeneous network environment, such as network data processing system 100 in FIG. 1.

In accordance with a preferred embodiment of the present invention, a filesystem or filesystem server is capable of associating two or more ACLs with a given filesystem object. This may be implemented as a filesystem, which is capable of directly storing more than one ACL within the filesystem and then selecting the ACL based on the access method or file system type of the requester. For example, a flag may indicate that the filesystem has been remotely accessed by a particular client. Alternatively, this may be implemented by storing the second and subsequent ACL objects in some form of storage separate from the standard location where the filesystem would normally store ACLs. Thus, when client running Windows NT™ accesses an NT filesystem and that filesystem is running on a server, which enables the present invention, that client/server pair communicates using Windows NT™ network filesystem protocols and methods. These protocols and access methods define the filesystem type of the requester.

Each of the multiple ACL types exists separately and distinctly from the others. A request to retrieve an ACL considers the access method, such as distributed filesystem server type or local filesystem mount options, when determining which ACL to return to the requester. A request to modify an ACL considers the filesystem access method, as described above, when determining where the ACL is to be stored. A request to perform filesystem object access checking is performed using an ACL of the type associated with the access method used to access the filesystem. In each of these operations, the ACL is regarded as a separate and distinct ACL, without regard for any other ACLs that may also be associated with the object.

An initial request for an ACL may be satisfied by translating an existing ACL in one format to the desired format. An exemplary mechanism for translating between ACL formats is described in US patent application Ser. No. 10/611,020 (Publication No. US 2005/0015674), entitled "Method, Apparatus, and Program for Converting, Administering, and Maintaining Access Control Lists Between Differing Filesystem Types," filed Jul. 1, 2003, and herein incorporated by reference. Alternatively, a default ACL may be provided based on rules associated with the filesystem. However, once the initial ACL is provided, that ACL becomes a new, separate, and distinct ACL for the associated filesystem object. Now further ACLs for that filesystem type are generated for that filesystem object.

Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages.

Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
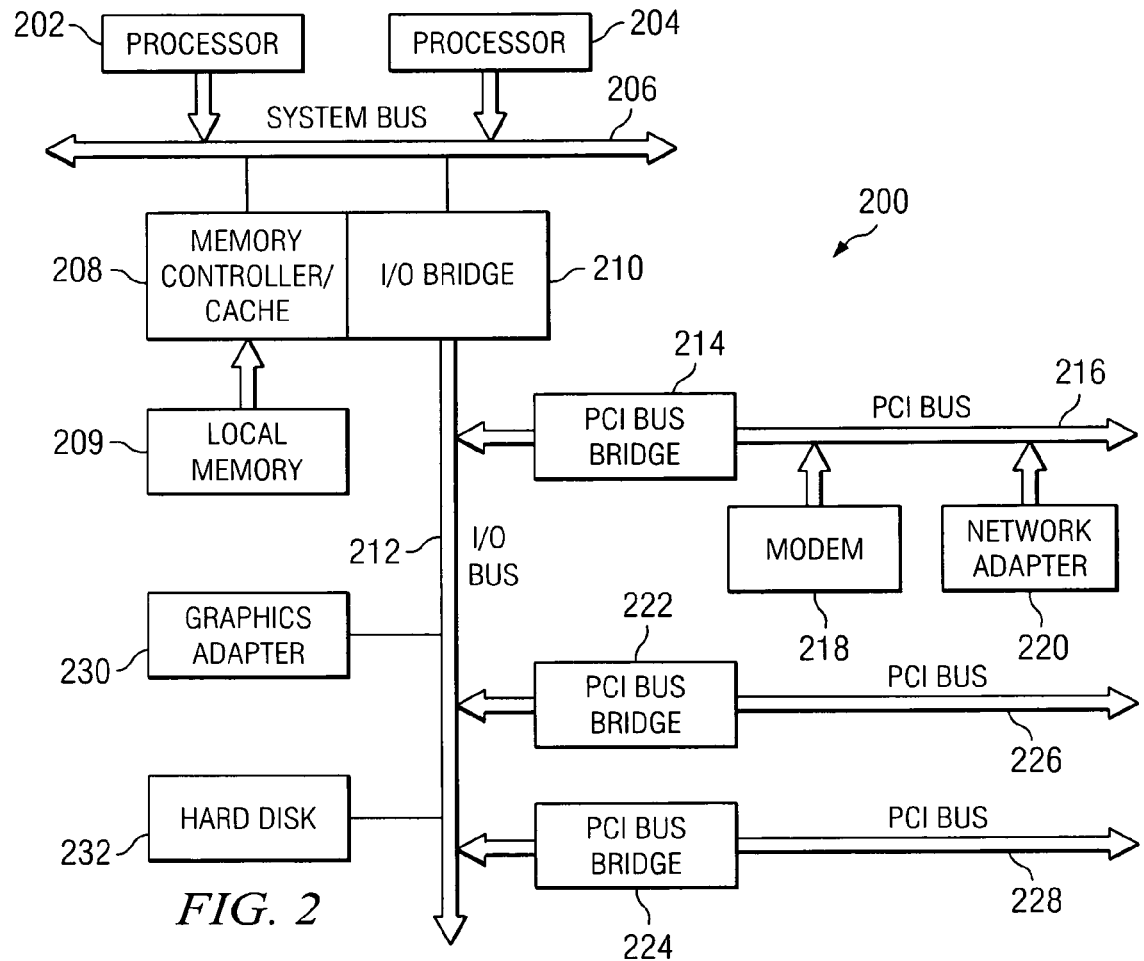
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention. The data processing system depicted in FIG. 2 may be, for example, an IBM e-Server pSeries system, a product of International Business Machines Corporation in Armonk, N.Y.

Figure 3:
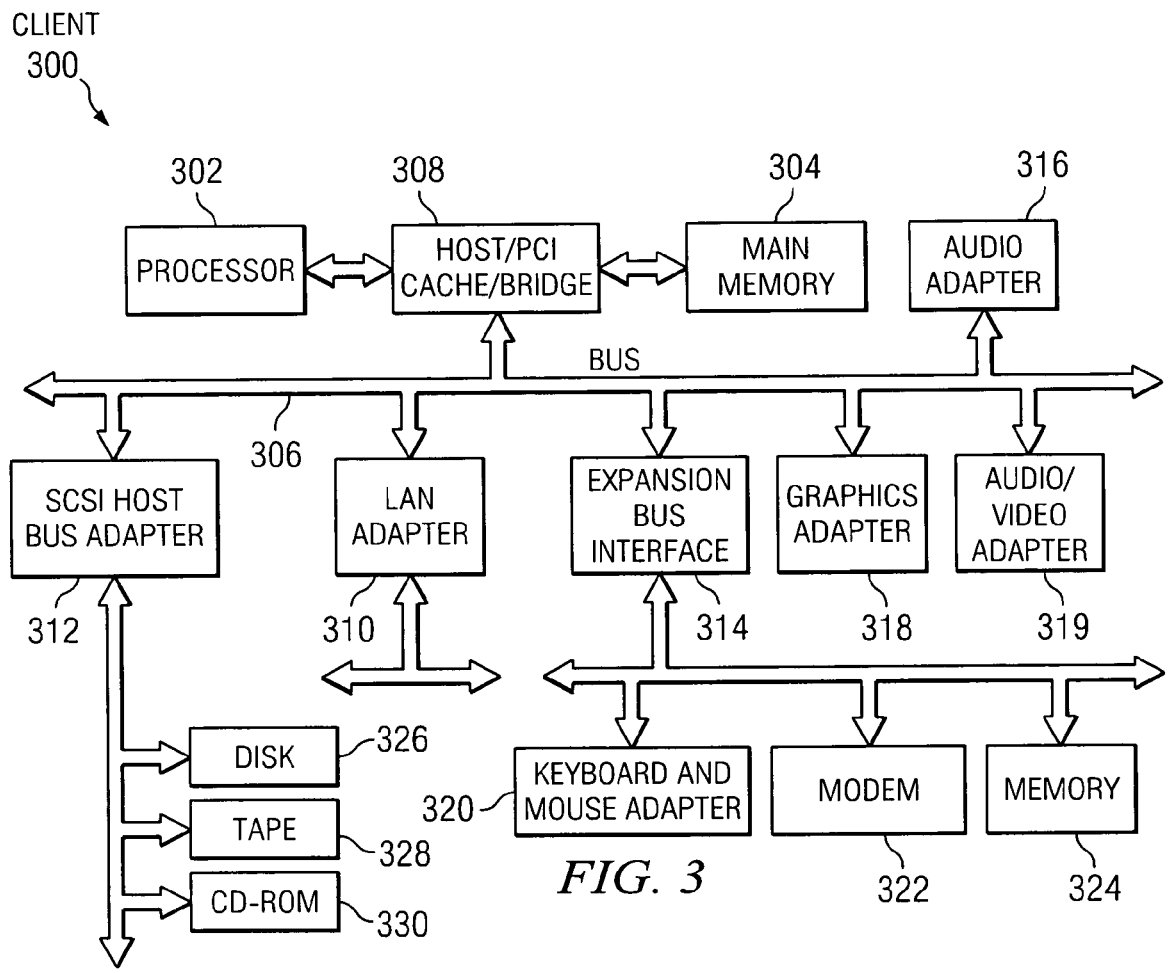
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards.

In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
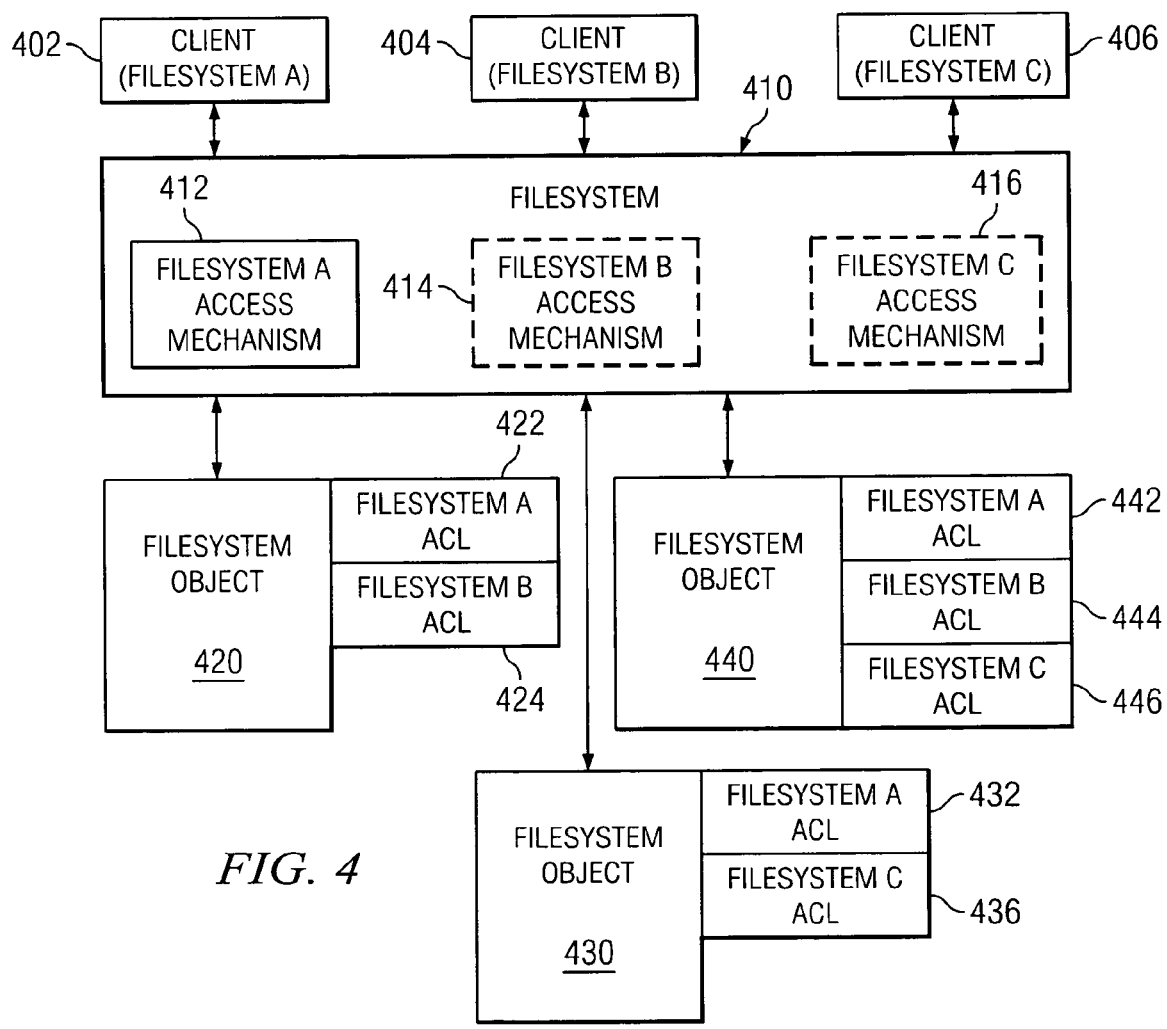
FIG. 4 is a block diagram illustrating a filesystem in a heterogeneous environment in accordance with a preferred embodiment of the present invention.

With reference to FIG. 4, a block diagram illustrating a filesystem in a heterogeneous environment is shown in accordance with a preferred embodiment of the present invention. Clients 402, 404, 406 access filesystem 410. Client 402 stores and accesses files using filesystem A; client 404 stores and accesses files using filesystem B; and, client 406 stores and accesses files using filesystem C.

Filesystem 410 stores filesystem objects 420, 430, 440. Filesystem 410 includes a native access mechanism 412 for a native filesystem type. In this example, filesystem A is the native filesystem type. Filesystem object 420 includes filesystem A ACL 422; filesystem object 430 includes filesystem A ACL 432; and, filesystem object 440 includes filesystem A ACL 442. Thus, when client 402 requests an ACL for a filesystem object, such as filesystem object 420, the filesystem retrieves the native filesystem ACL using filesystem A access mechanism 412, because client 402 uses the native access mechanism.

In accordance with a preferred embodiment of the present invention, filesystem 410 includes filesystem B access mechanism 414 and filesystem C access mechanism 416. The access mechanisms are each individually known. However, the present invention provides a plurality of such access mechanisms for a single filesystem. Thus, when a client or application requests an ACL using a non-native filesystem, a non-native access mechanism may be used to retrieve the appropriate ACL.

For example, filesystem object 420 includes native ACL 422, as described above, and filesystem B ACL 424. If client 404 requests an ACL for filesystem object 420, filesystem 410 may identify that client 404 is accessing the filesystem remotely. This may be accomplished, for example, by storing a flag in a system table indicating for each client which access mechanism is to be used. Filesystem 410 then retrieves ACL 424 and returns it to client 404.

As another example, filesystem object 430 includes native ACL 432 and filesystem C ACL 436. Thus, if client 406 requests an ACL for filesystem object 430, the filesystem retrieves ACL 436 using filesystem C access mechanism 416. However, if client 406 requests an ACL for object 430, the filesystem must provide an ACL for the desired filesystem type. The filesystem may satisfy an initial request by translating an existing ACL, such as ACL 432, to the desired filesystem format. Alternatively, the filesystem may provide a default ACL for the desired filesystem type based on rules associated with the filesystem.

Filesystem object 440 has stored therewith ACL 442 for the native filesystem A, ACL 444 for filesystem B, and ACL 446 for filesystem C. Therefore, if a request for an ACL is received from any one of client 402, client 404, and client 406, filesystem 410 is configured to retrieve the appropriate ACL using an access mechanism corresponding to the requestor.

Figure 5:
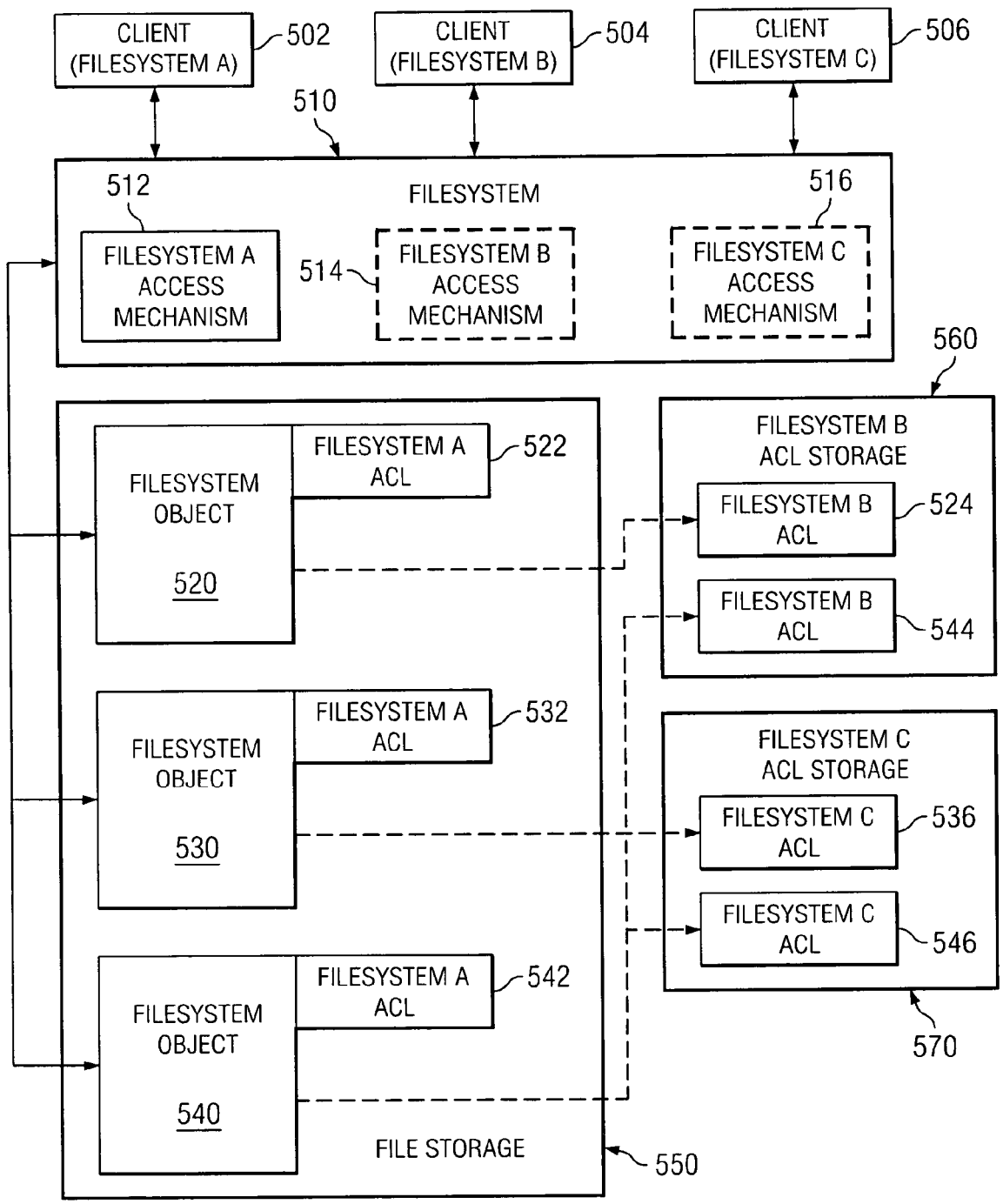
FIG. 5 is a block diagram illustrating a filesystem with separate ACL storage in accordance with a preferred embodiment of the present invention.

Turning to FIG. 5, a block diagram illustrating a filesystem with separate ACL storage is shown in accordance with a preferred embodiment of the present invention. Clients 502, 504, 506 access filesystem 510. Client 502 stores and accesses files using filesystem A; client 504 stores and accesses files using filesystem B; and, client 506 stores and accesses files using filesystem C.

Filesystem 510 stores filesystem objects 520, 530, 540 in file storage 550. Filesystem 510 includes a native access mechanism 512 for a native filesystem type. In this example, filesystem A is the native filesystem type. Filesystem object 520 includes filesystem A ACL 522; filesystem object 530 includes filesystem A ACL 532; and, filesystem object 540 includes filesystem A ACL 542.

In accordance with a preferred embodiment of the present invention, filesystem 510 includes filesystem B access mechanism 514 and filesystem C access mechanism 516. When a client or application requests an ACL using a non-native filesystem, a non-native access mechanism may retrieve the appropriate ACL. In the depicted example, non-native ACLs are stored in a storage, which is separate from the normal location where the filesystem stores the native ACLs.

The storage locations for ACL storage may be divided in several ways. For example, an ACL storage location may be provided for each directory, each filesystem, or for each portion of a file system. A portion of a filesystem may be, for example, a cylinder group, a logical partition, etc.

In the example shown in FIG. 5, a separate ACL storage is provided for each filesystem type or each access mechanism. Filesystem object 520 has an ACL 524 for filesystem B stored in filesystem B ACL storage 560. Filesystem object 530 has an ACL 536 for filesystem C stored in filesystem C ACL storage 570. Filesystem object 540 has an ACL 544 for filesystem B stored in filesystem B ACL storage and ACL 546 for filesystem C stored in filesystem C ACL storage.

In the depicted example, if client 502 requests an ACL for a filesystem object, such as filesystem object 520, the filesystem retrieves the native filesystem ACL using filesystem A access mechanism 512, because client 502 uses the native access mechanism. However, if client 504 requests an ACL for a filesystem object, such as filesystem object 540, the filesystem retrieves an ACL from filesystem B ACL storage 560 using filesystem B access mechanism 514. Similarly, if client 506 requests an ACL for a filesystem object, such as filesystem object 530, the filesystem retrieves an ACL from filesystem C ACL storage 570 using filesystem C access mechanism 516.

Figure 6:
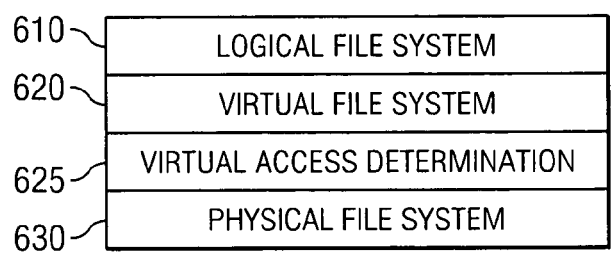
FIG. 6 is a block diagram depicting a filesystem software hierarchy in accordance with a preferred embodiment of the present invention.

With reference to FIG. 6, a block diagram depicting a filesystem software hierarchy is shown in accordance with a preferred embodiment of the present invention. Logical filesystem (LFS) 610 is the level of the filesystem at which users can request file operations by system call. This level of the filesystem provides the kernel with a consistent view of what might be multiple physical filesystems and multiple filesystem implementations. As far as the logical file system is concerned, file system types, whether local, remote, or strictly logical, and regardless of implementation, are indistinguishable.

Virtual filesystem (VFS) 620 provides a bridge between the physical and logical filesystems. This level allows support for multiple concurrent instances of physical filesystems, each of which is called a file system implementation. The virtual filesystem is an abstraction of a physical filesystem implementation. It provides a consistent interface to multiple filesystems, both local and remote. This consistent interface allows the user to view a directory tree on a running system as a single entity even when the tree is made up of a number of diverse filesystem types. The VFS also allows the logical filesystem code in the kernel to operate without regard to the type of filesystem being accessed.

Physical filesystem (PFS) 630 level manages permanent storage of data. In accordance with a preferred embodiment of the present invention, the actual access determination code is removed from the PFS level and a new virtual access determination level 625 is created between the VFS and PFS levels. The virtual access determination code uses the additional access mechanisms in the filesystem to retrieve an appropriate ACL. By using an access mechanism of the requester, the virtual access determination level may make access determinations for a non-native requester in a manner that is transparent to the requesting client or application, because an ACL that corresponds to the requestor is retrieved regardless of the native filesystem type of the filesystem.

Figure 7:
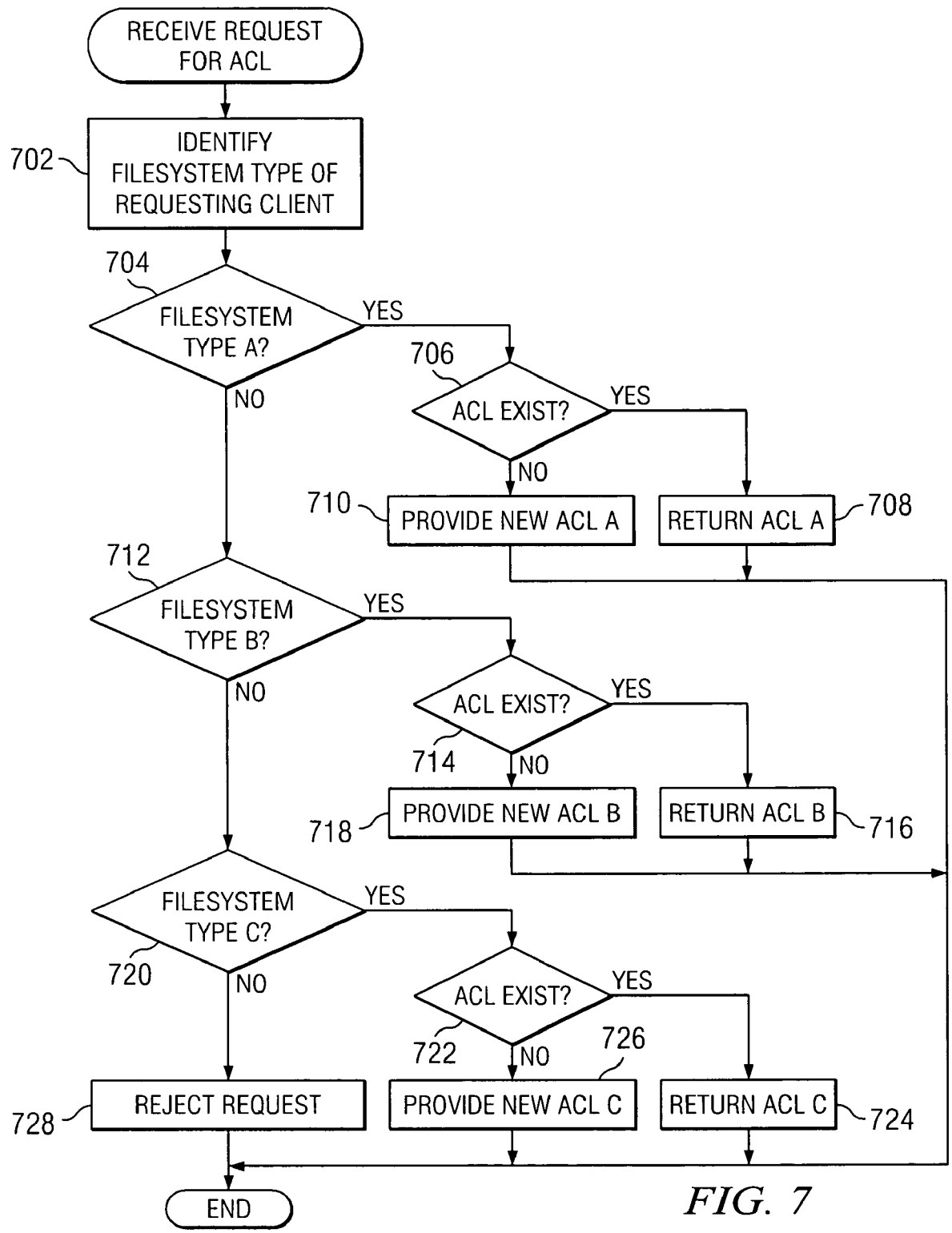
FIG. 7 is a flowchart illustrating an ACL retrieval in a heterogeneous filesystem in accordance with a preferred embodiment of the present invention.

FIG. 7 is a flowchart illustrating an ACL retrieval in a heterogeneous filesystem in accordance with a preferred embodiment of the present invention. The process begins by receiving a request for an ACL. The process identifies a filesystem type of a requesting client (step 702) and a determination is made as to whether the filesystem type of the requestor is a first enabled filesystem type A (step 704).

If the filesystem type of the requester is filesystem type A, a determination is made as to whether an ACL exists for the filesystem object and for the filesystem type of the requestor (step 706). If an ACL exists, the process retrieves the ACL using the appropriate access mechanism (step 708) and ends. If an ACL does not exist for the filesystem object and for the filesystem type of the requester in step 706, the process provides a new ACL in the desired filesystem type (step 710) and the process ends.

The ACL may be provided by translating an existing ACL in one format, such as the native filesystem type, to the desired format. Alternatively, a default ACL may be provided based on rules associated with the filesystem. In a preferred embodiment, the filesystem includes an access mechanism for each possible filesystem access type. That is, if the server accepts a request to access a filesystem as an NTFS filesystem, the server must also support the NTFS access rules.

If the filesystem type of the requester is not filesystem type A in step 704, a determination is made as to whether the filesystem type of the requester is a second enabled filesystem type B (step 712). If the filesystem type of the requester is filesystem type B, a determination is made as to whether an ACL exists for the filesystem object and for the filesystem type of the requester (step 714). If an ACL exists, the process retrieves the ACL using the appropriate access mechanism for filesystem type B (step 716) and ends. If an ACL does not exist for the filesystem object and for filesystem type B in step 714, the process provides a new ACL in filesystem type B (step 718) and the process ends.

If the filesystem type of the requester is not filesystem type B in step 712, a determination is made as to whether the filesystem type of the requester is a third enabled filesystem type C (step 720). If the filesystem type of the requester is filesystem type C, a determination is made as to whether an ACL exists for the filesystem object and for the filesystem type of the requester (step 722). If an ACL exists, the process retrieves the ACL using the appropriate access mechanism for filesystem type C (step 724) and ends. If an ACL does not exist for the filesystem object and for filesystem type C in step 722, the process provides a new ACL in filesystem type C (step 726) and the process ends.

If the filesystem type of the requester is not filesystem type C in step 720, the process rejects the request (step 728) and ends.

In the example depicted in FIG. 7, the filesystem supports three filesystem types A, B, and C. These filesystem types may correspond with any known filesystem type, such as NTFS, AIX, SVR4, etc. The filesystem may include more or fewer supported filesystem types, depending upon the implementation. For example, the filesystem may be designed to support only two filesystem types. As another example, a large enterprise may attempt to support every filesystem type by including an access mechanism for every known filesystem type.

Thus, the present invention solves the disadvantages of the prior art by providing a mechanism for administering and maintaining access control lists for a filesystem in a heterogeneous network environment. A filesystem includes an access mechanism for a native filesystem type and access mechanisms for one or more additional filesystem types. Access control lists may be stored for the additional filesystem types, as needed. Thus, any given filesystem object may have associated therewith two or more access control lists.

Clients are not required to perform any conversion of ACL formats. Also there is no ambiguity in the security model. Each form of access has a separate and distinct ACL format which may correspond to that client's expected ACL format. The administrative tools of that client are capable of manipulating the ACL without regard to loss of information, which may occur during translation.

Once provided, the ACLs of differing formats are independent. That is, a filesystem object may have a first ACL for a first filesystem type and a second ACL for a second filesystem type, wherein the first ACL may define a different set of permissions than the second ACL for the same user. For example, a user may have write access to a filesystem object when using an AIX client, but only read access to the same object when using a Windows™ client. Change in access rights in one ACL does not apply to other ACLs for the same object.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for managing access control lists in a filesystem, the method comprising:

associating two or more access control lists with a given filesystem object in a heterogeneous filesystem, wherein the heterogeneous filesystem comprises a native filesystem and one or more additional differing filesystems, and each of the access control lists are usable for controlling access to the given filesystem object by a particular type of filesystem within the heterogeneous filesystem;

responsive to receiving, from a requestor, a request for an access control list associated with the given filesystem object, determining a filesystem type of the requestor;

determining whether an access control list in the two or more access control lists associated with the given filesystem object matches the filesystem type of the requestor, wherein the two or more access control lists associated with the filesystem object comprises multiple, different access control list formats and responsive to a determination that an access control list in the two or more access control lists associated with the given filesystem object matches the filesystem type of the requestor, returning an access control list from the two or more access control lists for the given filesystem object matching the filesystem type of the requestor, wherein the step of returning the matching access control list includes accessing the matching access control list using an access mechanism associated with the filesystem type of the requestor, wherein the access mechanism is selected from a plurality of access mechanisms that each facilitate access control for a given filesystem type within the heterogeneous filesystem by providing access to a given access control list that corresponds to a given one of the plurality of access mechanisms.

2. The method of claim 1, further comprising:

responsive to a determination that a matching access control list does not exist, providing a new access control list for the filesystem type of the requestor; and returning the new access control list.

3. The method of claim 2, wherein the step of returning the new access control list includes accessing the new access control list using an access mechanism associated with the filesystem type of the requestor.

4. The method of claim 2, wherein the step of providing a new access control list for the filesystem type of the requestor includes translating an existing access control list to the filesystem type of the requestor.

5. The method of claim 2, wherein the step of providing a new access control list for the filesystem type of the requestor includes providing a default access control list for the filesystem type of the requestor based on rules associated with the filesystem.

6. The method of claim 1, wherein the step of associating two or more access control lists with a given filesystem object includes storing the two or more access control lists in file storage with the given filesystem object.

7. The method of claim 1, wherein the step of associating two or more access control lists with a given filesystem object includes storing a native access control list in file storage with the given filesystem object and storing one or more non-native access control lists in access control list storage separate from the file storage.

8. The method of claim 7, wherein an access control list storage is provided for each directory, each filesystem, or for each portion of a file system.

* * * * *